United States Patent [19]

Stecher et al.

[11] 3,970,322
[45] July 20, 1976

[54] CYLINDER HEAD GASKET FOR INTERNAL-COMBUSTION ENGINE

[75] Inventors: Friedhelm Stecher, Burscheid; Josef Fazekas, Wermelskirchen; Paul Jöhren, Dortmund-Horde; Martin Morsbach, Hilgen, all of Germany

[73] Assignee: Goetzewerke-Friedrich Goetze AG, Burscheid, Germany

[22] Filed: Jan. 31, 1974

[21] Appl. No.: 438,356

[30] Foreign Application Priority Data
Jan. 31, 1973 Germany............................ 2304505

[52] U.S. Cl. ......................... 277/235 A; 277/235 B
[51] Int. Cl.² .......................................... F16J 15/12
[58] Field of Search .................... 277/235 B, 235 A

[56] References Cited
UNITED STATES PATENTS

| | | | |
|---|---|---|---|
| 2,055,471 | 9/1936 | Balfe .............................. | 277/235 B |
| 2,074,388 | 3/1937 | Gordon ........................ | 277/235 B X |
| 2,245,122 | 6/1941 | Balfe ............................. | 277/235 B |
| 2,289,620 | 7/1942 | Bernstein ..................... | 277/234 |
| 2,330,106 | 9/1943 | Bernstein et al. ............. | 277/233 X |
| 3,532,349 | 10/1970 | Czernik ......................... | 277/235 B |

FOREIGN PATENTS OR APPLICATIONS 1,930,867 12/1970 Germany......................... 277/235 B Primary Examiner—Samuel B. Rothberg
Attorney, Agent, or Firm—Spencer & Kaye

[57] ABSTRACT

A cylinder head gasket for internal combustion engines comprises at least one layer of a soft material having pores which are enriched with an impregnating agent and edges which are bordered by a casing. The pores of the soft material underneath the flange are kept free of impregnating agent.

5 Claims, 1 Drawing Figure

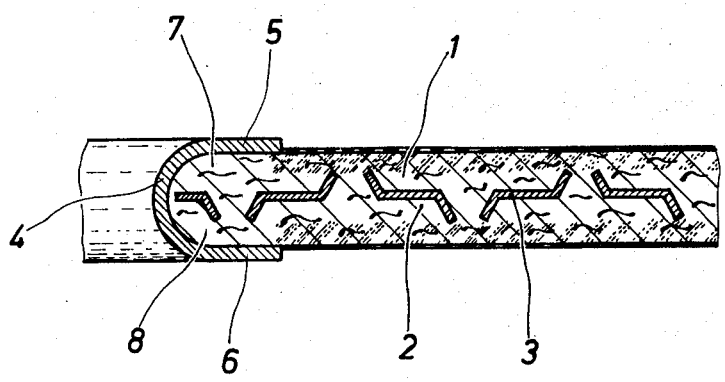

CYLINDER HEAD GASKET FOR INTERNAL-COMBUSTION ENGINE

BACKGROUND OF THE INVENTION

The present invention relates to a cylinder head gasket for internal-combustion engines including at least one disc of soft material whose pores are completely or partially enriched with an impregnatng agent which in its final stage is thermoplastic, duroplastic or elastic, the edges of the disc being bound by a flange.

Cylinder head gaskets for internal-combustion engines usually consist of a thermally stable fibrous material such as asbestos, for example, which is possibly reinforced by an embedded metal disc. Small quantities of natural or synthetic rubber are usually added to the asbestos fibers in order to provide better binding.

Cylinder head gaskets have passages for the combustion chambers, the coolant and the lubricant. At the edges of these passages the seal must be particularly tight against the hot gases from the combustion chamber, which gases are under pressure, the lubricant and the coolant, which may possibly contain anti-freeze and corrosion protection agents. A normal asbestos fiber disc enriched with binders and possibly reinforced with embedded metal discs is not satisfactory for such purposes because the porosity of the asbestos material is too high and thus its cross-sectional density is too low.

On the one hand, in order to provide a better surface seal, the edges of the passages have been provided with a bordering casing, usually of copper or iron, which may be coated with a plastic layer of aluminum or a synthetic material. The bordering casing for the combustion chamber passage generally has a U-shaped cross section with the opposing arms of the U lying on the opposing lateral planar surfaces of the gasket and the curved base of the U lying against the cylindrical surface of the passage so that all of edges of the combustion chamber passages are protected. The bordering casing for coolant, lubricant and other passages generally comprises metal discs which lie on the lateral planar surfaces of the gasket to protect the planar surfaces of the gasket, while the cylindrical surfaces of these passages are not protected by a casing. On the other hand, it is known to increase the cross-sectional density by coating or saturating the asbestos fiber layer with a synthetic material to increase the sealing performance of the gasket. According to German Pat. No. 1,072,032, a gasket is impregnated in the immediate region of the passages with impregnating agents such as solutions, dispersions, emulsions or latexes of polymerized or polymerizable substances. According to German Pat. No. 740,388 and U.S. Pat. No. 2,040,348 the saturating agent is a self-drying vegetable oil, such as linseed oil for example.

Naturally the cross-sectional density of cylinder head gaskets increases with the quantity of impregnating agent absorbed in the fiber. However, the more the fiber is saturated, the lower becomes its compressibility. If the latter becomes too low, the gasket can no longer adapt itself too well to the unevennesses of the cylinder head and of the cylinder block and part of its sealing capability is lost.

This applies particularly for the area of the gasket having a bordering casing and especially for the area of the gasket having the metal casings on opposing sides of the gasket because there the thickness of the cylinder head gasket is increased by twice the thickness of the metal. Consequently when the cylinder head gasket is installed it must be more compressible in this area to compensate for these differences in thickness.

SUMMARY OF THE INVENTION

It is the object of the present invention to provide a cylinder head gasket in which the compressibility of the asbestos fiber layer underneath the bordering casing is particularly good.

This is accomplished according to the present invention by having the pores of the asbestos fiber material below the casing be free of impregnating agent. The higher porosity thus obtained for the asbestos material beneath the casing makes the gasket more compressible in this region. The gasket according to the present invention can be particularly easily manufactured in that the cylinder head gasket consisting of the possibly metallically reinforced asbestos fiber layer is saturated with the impregnating agent after the gasket has been cut and provided with the bordering casings. This can be effected by rolling, spraying or immersing.

DETAILED DESCRIPTION OF THE INVENTION

The gaskets of the present invention are made of a thermally stable soft material such as a fiber fleece of asbestos. The soft material is cut out in the specific shape required for the particular application it is to be used in, such as a cylinder head gasket for an internal-combustion engine, and generally is in the shape of a disc having various passages for the combustion chambers, lubricant and coolant. The gasket can comprise a single disc of soft material or two external soft material discs having a metal reinforcement, such as a metal disc, therebetween.

The exposed surfaces of the soft material are provided with at least one metal casing. This metal casing can be in the form of a U-shaped bordering casing which covers the edges of the gasket adjacent the combustion chambers to protect these edges or can be a metal plate covering defined lateral planar surface portions of the soft material. Usually, the gaskets of the present invention contain both a U-shaped bordering casing on the edges adjacent the combustion chamber and metal plates on other surface portions of the soft material such as metal discs protecting the planar edges of the coolant and lubricant passages.

After the gasket is formed into the desired shape and provided with its metal casing or casings, an impregnating agent for the fibrous material is applied to the gasket. This impregnating material is a liquid which is applied to the asbestos by immersion, spraying or rolling so that the asbestos fiber layer receives a good cross-sectional and surface density. The liquid can at the same time be applied to the outer surface of the metal casing, but if no coating is desired for the metal casing at this time, the metal casing can be protected by a suitable shield or the impregnation of the asbestos is otherwise controlled to ensure that the metal casing is not coated with liquid. The viscosity of the liquid that is used in the present invention preferably is low so that the asbestos material will be well saturated and a relatively thin coating will be produced on the surfaces of the metal portions to effect a surface seal.

The liquid used for impregnation of the soft disc preferably consists essentially of an organic, synthetic, completely polymerizable liquid which does not contain any volatile agents which would evaporate during the polymerization or subsequent use of the gasket. Use of a polymerizable liquid that does not emit evaporating substances insures that undesirable pores and cavities will not form in the soft disc during the polymerization of the liquid and prevents the soft disc from swelling. Swelling and pore or cavity formation in the soft disc decreases its cross-sectional density and thus its sealing performance. The use of a completely polymerizable liquid in forming a gasket is described in our copending application U.S. Ser. No. 438,357, filed on the same day herewith, entitled "Gasket Impregnated With a Polymerizable Liquid and Method For Its Manufacture", assigned to the same assignee as the present invention, and hereby incorporated by reference. The polymerizable liquid can be polymerized thermally, peroxidically, with sulfur, or by other well known means depending on the particular liquid used.

Exemplary polymerizable liquid saturating agents that do not have any volatile agents that can be employed in the practice of the present invention include polybutadiene, methacrylates, crotonaldehyde, systems of isocyanates with alcohols or amines, systems of epoxides with alcohols or amines, systems of acroylchloride and esters of acrylic acid.

These polymerizable liquids used in the present invention are well known and can be polymerized in accordance with conventional methods. Depending on the particular liquid, polymerization can occur through the use of free radical initiation such as by compounds such as organic peroxides, through the use of compounds such as sulfur which is a well known curing and vulcanizing agent or by thermal means.

Liquids polymerizable by sulfur include liquid polybutadiene and liquid styrol-butadiene-rubber. These liquids can be polymerized by conventional technique as by heating a mixture of the liquid and sulfur at temperatures of from about 120° to 190°C for 2 to 30 minutes. Liquids polymerizable by organic peroxides such as benzoyl peroxide include methacrylates, crotonaldehyde and esters of acrylic acid. These liquids can be polymerized by conventional methods well known in the art as by heating a mixture of the liquid and peroxide at temperatures of from about 125° to 200°C for 2 to 30 minutes.

Thermally polymerizable liquids that can be used in the practice of the present invention are those liquids that can be polymerized solely by heat and include systems of epoxides with amines or alcohols, systems of isocyanates with amines or alcohols. Generally these liquids are heated at a temperature between 40° and 200°C for about 5 minutes to 10 hours.

The polymerizable liquids used in the present invention preferably have a low viscosity of 200 to 1.500 centipoises at a temperature of 20°C, and when completely polymerized have a molecular weight in the range between 3.000 and 80.000. As used herein, the term "completely polymerizable" indicates 80.000.

Although it is preferred to use a polymerizable liquid which does not contain any volatile agents, a solution, an emulsion, a latex, or a dispersion of already polymerized or polymerizable synthetic or rubber ingredients can also be used under certain circumstances.

This is when very flat gaskets were produced and the liquids used for the impregnation may be polybutene latex, acrylate emulsions, urea dispersions or liquids, or solution of styrol or styrol butadiene.

In order to obtain a tight cylinder head gasket and provide a good seal, the asbestos fiber layer in the ready to be installed state must still be compressible after it is impregnated. Preferably, therefore, not all of the pores of the asbestos fiber layer are completely penetrated with the impregnating agent and the impregnating agent is only partially polymerized before the gasket is installed in the engine. In this way, it is possible for the gasket to plastically adapt itself to unevenesses in the surfaces to be sealed. The partial polymerization can be controlled by additives and/or by regulating the temperature, time and other reaction conditions of the polymerization as is well known in the art. The partial polymerization should be conducted to a point where the liquid mass takes on a solid condition, but can still be plastically deformed. In the installed state, at the operating temperature of the engine, a further thermal polymerization will then take place so as to produce the desired high cross-sectional density against the gases and liquids to be sealed off.

The partial polymerization can be controlled by additives and/or by regulating the temperature, time and other reaction conditions of the polymerization as is well known in the art. The partial polymerization should be conducted to a point where the liquid mass takes on a solid condition, but can still be plastically deformed.

Typical non-volatile additives for controlling the polymerization which would not evaporate under the conditions of polymerization include inhibitors and retarders such as amines. When the gasket is installed in an engine, it is subjected to temperatures in the range of about 90° to 180°C and at these temperatures the saturating agent becomes completely polymerized.

BRIEF DESCRIPTION OF THE DRAWING

The sole FIGURE of the drawing shows a sectional view of the edge of a cylinder head gasket adjacent the combustion chamber.

EXAMPLE

As shown in the drawing, a gasket consists of a metal disc 3 which is covered on both sides with asbestos plates 1 and 2. The sealing edge 10 is bordered by a U-shaped metal casing 4 having arms 5 and 6 which lie on the opposing planar surfaces of the gasket. In accordance with the invention, the asbestos discs 1 and 2 are enriched with an impregnating agent over approximately two-thirds of their cross sections, but the edges 7 and 8 of the asbestos discs which are disposed beneath the casing arms 5 and 6 are free of impregnating agent. This impregnation is performed by immersing the gasket in a bath containing 100 parts of viscous polybutadiene (molecular weight 1500) and 12 parts mineral oil as a filler so that part of the pores of the asbestos are saturated with the polybutadiene.

The polybutadiene contains 8 to 14 parts of benzoyl peroxide as a curing agent and has a viscosity of 750 to 1,500 centipoises at a temperature of 20° to 50°C. The gasket is kept in the bath for 5 minutes and then removed. A shield is provided for the metal casing 4 so that it is kept free of impregnating agent. The gasket is removed from the bath and placed in a furnace and heated for about three hours at about 130°C to effect a partial polymerization. By the addition of, for example, agents to protect against complete polymerization chain termination reactions occur which permit regulation of the amount and degree of polymerization so that the polymerizate still has a good plasticity. Thereafter, the surface of the gasket is coated in a conventional manner with a layer containing graphite, talcum or similar substances to counteract tackiness. The resulting cylinder head gasket is now installed in an engine. The gasket adapts itself well to the unevennesses in the surface to be sealed because the asbestos layer still contains pores, the impregnating liquid has been partially polymerized and is still plastic and compressible, and the asbestos underneath the metal casing is free of liquid.

After installation in the engine, a further thermal polymerization of the impregnated agent takes place at the operating temperatures of the engine so that the desired cross-sectional density is obtained with the desired impermeability to combustion gases, lubricants and coolants.

As can be seen in the drawing, the areas of asbestos underneath metal casing 4 and defined by arms 5 and 6 are kept free of impregnating agent so that these asbestos areas are more compressible than the remaining saturated areas of asbestos. By keeping the asbestos free of impregnating agent in the areas protected by the metal casing, the asbestos in these areas is more compressible and compensates for the difference in compressibility caused by the metal.

Generally, gaskets produced in accordance with the present invention have a cross-sectional density of between 1,5 to 1,8 g/cc.

The agent which is used to protect against complete polymerization is N-nitrosodiphenylamine.

It will be understood that the above description of the present invention is susceptible to various modifications, changes and adaptations, and the same are intended to be comprehended within the meaning and range of equivalents of the appended claims.

We claim:

1. Cylinder head gasket for internal-combustion engines comprising at least one fiber layer of a soft material having pores which are enriched with an impregnating agent to increase the cross-sectional density of the soft material and edges which are bordered by a casing wherein the fiber layer is impregnated only outside of the region of the casing so that the pores of said fiber layer underneath said casing are free of impregnating agent and the fiber layer underneath said casing is more compressible than the remainder of the fiber layer.

2. The gasket as defined in claim 1 wherein the soft material is reinforced with a metal insert embedded in its interior.

3. The gasket as defined in claim 1 wherein the impregnating agent is produced from a liquid which consists essentially of an organic, synthetic, completely polymerizable liquid that does not contain any volatile agents.

4. The gasket as defined in claim 1 wherein the gasket has a passage for a combustion chamber and the casing has a U-shaped cross section to protect the edges of said passage.

5. The gasket as defined in claim 4 wherein the arms of the U lie on opposing planar surfaces of the gasket and the base of the U lies against the interior surface of said passage.

* * * * *